(12) United States Patent
Glanville

(10) Patent No.: US 12,023,851 B2
(45) Date of Patent: Jul. 2, 2024

(54) METHOD OF MANUFACTURING REINFORCED PIPE

(71) Applicant: Ridgway Machines Ltd, Leicester (GB)

(72) Inventor: Andrew Philip Glanville, Leicester (GB)

(73) Assignee: RIDGWAY MACHINES LTD, Leicester (GB)

( * ) Notice: Subject to any disclaimer, the term of this patent is extended or adjusted under 35 U.S.C. 154(b) by 450 days.

(21) Appl. No.: 17/432,978

(22) PCT Filed: Jan. 30, 2020

(86) PCT No.: PCT/GB2020/050217
§ 371 (c)(1),
(2) Date: Aug. 23, 2021

(87) PCT Pub. No.: WO2020/174210
PCT Pub. Date: Sep. 3, 2020

(65) Prior Publication Data
US 2022/0161484 A1    May 26, 2022

(30) Foreign Application Priority Data
Feb. 26, 2019   (GB) ..................... 1902591

(51) Int. Cl.
*F16L 9/04*   (2006.01)
*B29C 53/56*   (2006.01)
(Continued)

(52) U.S. Cl.
CPC .......... *B29C 63/065* (2013.01); *B29C 53/562* (2013.01); *B29C 63/0069* (2013.01);
(Continued)

(58) Field of Classification Search
CPC ... F16L 11/24; F16L 9/16; F16L 11/16; B29C 53/562; B29C 63/0069; B29C 63/10; B29C 63/14
(Continued)

(56) References Cited

U.S. PATENT DOCUMENTS 2,316,349 A  *  4/1943  Mcminn ................ B23K 1/002
                                                  220/DIG. 29
2,641,301 A  *  6/1953  Gerber ..................... B29C 66/49
                                                  156/95
(Continued)

FOREIGN PATENT DOCUMENTS

EP      1118450 A      7/2001
EP      1118450 A3     11/2001
(Continued)

OTHER PUBLICATIONS

International Search Report and Written Opinion of the ISA for application PCT/GB2020/050217, with Notification, mailed Apr. 30, 2020, 14 pages.

*Primary Examiner* — Patrick F Brinson
(74) *Attorney, Agent, or Firm* — Kilyk & Bowersox. P.L.L.C.

(57) ABSTRACT

A method of manufacturing a reinforced pipe (7) comprising: wrapping a pipe (1) in reinforcing tape (2) to form a wrapped pipe having an outer circumference consisting of a first circumferential portion (4) and a second circumferential portion (6); and passing the first circumferential portion (4) over one or more heating elements (3) to fuse the reinforcing tape (2) of said first circumferential portion (4); wherein: the first circumferential portion (4) is between 1% and 50% of the outer circumference; and the second circumferential portion (6) is not passed over a heating element (3) and is not fused. The method is advantageous in that it can provide reinforced pipes (7) in a simpler and cheaper way because it (Continued)

Figure 1:
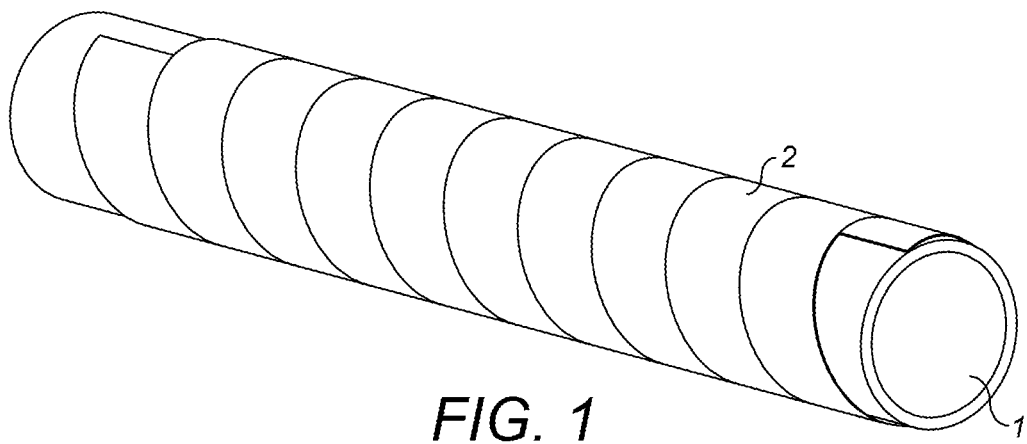

is not essential that the entirety of the outer circumference of the reinforced pipe (7) is fused. A reinforced pipe (7) produced according to the method of the present invention is also provided.

16 Claims, 1 Drawing Sheet

(51) Int. Cl.
    *B29C 63/00*     (2006.01)
    *B29C 63/06*     (2006.01)
    *B29C 63/14*     (2006.01)
    *B29L 23/00*     (2006.01)

(52) U.S. Cl.
    CPC .............. *B29C 63/14* (2013.01); *F16L 9/042* (2013.01); *B29L 2023/22* (2013.01)

(58) Field of Classification Search
    USPC .................................. 138/129, 144, 154, 150
    See application file for complete search history.

(56) References Cited

U.S. PATENT DOCUMENTS

| | | | |
|---|---|---|---|
| 3,037,529 A * | 6/1962 | Hancik | ................. B29C 66/112 |
| | | | 102/466 |
| 2002/0100540 A1 | 8/2002 | Savitski et al. | |
| 2003/0211258 A1 | 11/2003 | Sridharan et al. | |
| 2010/0282401 A1 * | 11/2010 | Sekar | ................. B29D 99/0035 |
| | | | 156/190 |
| 2013/0276932 A1 * | 10/2013 | Taylor | ................. B29C 66/5229 |
| | | | 138/144 |
| 2016/0290534 A1 | 10/2016 | Taylor | |

FOREIGN PATENT DOCUMENTS

| | | |
|---|---|---|
| JP | 51-50969 A | 5/1976 |
| KR | 20020024145 A | 3/2002 |

* cited by examiner

METHOD OF MANUFACTURING REINFORCED PIPE

FIELD OF THE INVENTION

The present invention relates to the manufacture of pipes that are reinforced by wrapping in a reinforcing tape, for example a unidirectional tape. This is commonly done to improve the strength of the pipe and to provide improved burst protection.

BACKGROUND TO THE INVENTION

It is often desirable to increase the strength of many different pipelines, for example in order to provide improved burst protection. Pipes that require improved burst protection include, but are not limited to, polymeric pipes, such as HDPE, and nylon pipes. One method of increasing the strength of pipes is to wrap the pipe in a reinforcing tape, for example a unidirectional tape. An example of a suitable tape is Celstran® CFR-TP, which is a continuous fibre-reinforced product with a thermoplastic matrix.

Pipes can be wrapped in reinforcing tape either as a stage of the manufacturing process or as a separate step carried out on pre-formed pipes. In a pipe manufacturing process the pipe wrapping apparatus may be positioned at the end of a pipe manufacturing apparatus such that the pipe is wrapped in reinforcing tape after exiting a conventional pipe manufacturing apparatus. Alternatively if the pipe is wrapped as a separate step then a length of pre-formed pipe can be passed through a suitable pipe wrapping apparatus.

Typically, when wrapping pipes in reinforcing tape it is necessary and desirable to fuse the tape after wrapping. This can be done by heating the tape to a suitable temperature in order to fuse the layers of the tape together. This provides a more resilient structure and alters the reinforcing tape such that it is denser and substantially void-free. Fusing of the tape occurs as most reinforcing tapes, such as Celstran® CFR-RP, have a thermoplastic component that softens when heated.

If a wrapped pipe is not fused after wrapping then the reinforcing tape is susceptible to movement, if the pipe is put under bending stress. Further, if the reinforcing tape is not fused, it may provide less than optimal reinforcement to the pipe. However, the fusing of the reinforcing tape of a wrapped pipe can be a costly, technologically complex, and time-consuming process that significantly increases the cost of the pipe. In particular, fusing the reinforcing tape of a wrapped pipe must be done carefully in order to avoid excessive thermal build-up within the pipe. Excessive thermal build-up can damage the integrity of the wrapped pipe.

In light of the above there is a need for an improved method of producing wrapped pipes that provides the benefits of previous wrapped pipes but that reduces the cost and time of producing said pipes.

SUMMARY OF INVENTION

The present invention provides a method of manufacturing a reinforced pipe comprising: wrapping a pipe in reinforcing tape to form a wrapped pipe having an outer circumference consisting of a first circumferential portion and a second circumferential portion; and passing the first circumferential portion over one or more heating elements to fuse said first circumferential portion; wherein: the first circumferential portion is between 1% and 50% of the outer circumference; and the second circumferential portion is not passed over a heating element and is not fused.

The method of the present invention is advantageous in that only a first circumferential portion of the outer circumference of the wrapped pipe is fused and a second circumferential portion is not fused. This can simplify the fusing of the pipe, reduce the cost of fusing and/or consolidating the pipe, and reduce thermal build-up in the inner pipe. As will be readily understood, heating only a first circumferential portion that is less than 50% of the total outer circumference of a pipe is significantly simpler than heating the entire outer circumference of a pipe.

As discussed further below, a pipe produced by a method according to the present invention can be significantly superior to a pipe that is not wrapped in reinforcing tape or a pipe that is wrapped in reinforcing tape and is not fused. Furthermore, it has been found that a pipe produced by a method according to the present invention may have similar physical properties to a reinforced pipe according to the prior art that is fused around its entire outer circumference. Even if similar physical properties to a fully fused pipe are not produced, a pipe produced by a method according to the present invention will have much improved physical properties as compared to a pipe that is not wrapped in reinforcing tape.

The at least one heating element of the present invention may comprise any suitable heating element that is apparent to the person skilled in the art and includes laser heating and conventional heating elements.

Preferably the method of the present invention will be used continuously along the complete longitudinal length of a pipe. Alternatively, the method of the present invention may be applied at longitudinal lengths along the length of the pipe that are longitudinally spaced from one another. In said longitudinal lengths the method of the present invention will be applied and a first circumferential portion of a reinforcing tape will be fused. In the longitudinal spaces between said longitudinal intervals any reinforcing tape is not fused. Reinforcing tape may still be provided between said longitudinal intervals. For example, the complete longitudinal length of a pipe may be wrapped in reinforcing tape and then said reinforcing tape may only be fused in accordance with the method of the present invention in longitudinal lengths along the pipe that are longitudinally spaced from one another.

The method of the present invention may comprise wrapping the pipe in any manner considered appropriate and that might be apparent to the person skilled in the art.

In embodiments of the method of the present invention the pipe may be wrapped in only a single layer of reinforcing tape. Alternatively, the pipe may be wrapped in two, three, four, or more layers of reinforcing tape. If the pipe is wrapped in more than one layer of reinforcing tape it may be preferable that two immediately adjacent layers of reinforcing tapes are wrapped in different non-parallel directions. Similarly, each layer may be wrapped in a different non-parallel direction to each immediately adjacent layer. As will be readily appreciated, wrapping adjacent layers of reinforcing tape in different directions can provide a stronger reinforcement of the pipe.

If the method of the present invention comprises wrapping the pipe in two or more layers it may be preferable that the first circumferential portion is passed over the one or more heating elements only after the pipe has been wrapped in all of the two or more layers of reinforcing tape. That is, it may be preferable that the pipe is only passed over the one or more heating elements after the pipe has been completely wrapped in all of the layers of reinforcing tape. This can provide the simplest method of fusing the reinforcing tape of a pipe having multiple layers of reinforcing tape.

Alternatively, in order to provide complete fusing of the first circumferential portion of each layer of reinforcing tape, in embodiments of the method of the present invention the first circumferential portion may be passed over the one or more heating elements between wrapping the pipe in successive layers of reinforcing tape. A method according to this embodiment may be more complex and costly but can provide better fusing of the first circumferential portion, particularly when several layers of reinforcing tape are provided.

The first circumferential portion consists of between 1% and 50% of the total outer circumference of the reinforced pipe. In embodiments of the invention it may be preferable that the first circumferential portion consists of more than 5%, more than 10%, more than 15%, more than 20%, more than 25%, more than 30% or more than 40% of the total outer circumference of the reinforced pipe. Similarly, it may be preferable that the first circumferential portion consists of less than 40%, less than 35%, less than 30%, less than 25%, less than 20%, or less than 15% of the total outer circumference of the reinforced pipe. The chosen amount of the first circumferential portion will depend on the specific requirements of the reinforced pipe and the required processing time, cost, and complexity. A pipe with a smaller first circumferential portion will generally be simpler and cheaper to produce but may not be as strong and resilient as a pipe with a larger first circumferential portion.

For simplicity, in a method of the present invention the first circumferential portion may be passed over a single heating element. This can be done in a single pass such that the pipe is passed over the single heating element once and in doing so the entirety of the first circumferential portion is heated. Alternatively, the first circumferential portion may be passed over the single heating element two or more times. This may be done such that different parts of the first circumferential portion are heated in each pass. This may be advantageous in embodiments of the invention wherein the first circumferential portion is not circumferentially continuous.

In alternative embodiments, the first circumferential portion may be passed over two or more heating elements. Using two or more heating elements may be advantageous in reducing the number of passes over the heating elements, for example it may allow a larger circumferential portion to be heated in a single pass. Using two or more heating elements is particularly advantageous in embodiments of the invention in which the first circumferential portion is not circumferentially continuous as this can allow circumferentially separated parts of the first circumferential portion to be heated in a single pass.

In embodiments of the method of the present invention the pipe may not be axially rotated relative to the one or more heating elements as the first circumferential portion is passed over said one or more heating elements. In such embodiments, edges of the first circumferential portion will be substantially parallel to the axis of the pipe.

In alternative embodiments of the method of the present invention the pipe may be axially rotated relative to the one or more heating elements as the first circumferential portion is passed over said one or more heating elements. This results in a first circumferential portion that has edges that spiral around the outer circumference of the pipe.

The axial rotation of the pipe relative to the one or more heating elements can be achieved by axially rotating the pipe whilst the one or more heating elements are held stationary. Alternatively this can be achieved by rotating the heating elements about the pipe and not axially rotating the pipe. Alternatively, the pipe can be axially rotated at a first rate of rotation and the one or more heating elements can be rotated about the pipe at a second rate of rotation, preferably in a different direction of rotation.

In embodiments of the invention the first circumferential portion may be a single circumferentially continuous portion. In alternative embodiments the first circumferential portion consists of two or more circumferentially separated portions, for example, two, three, four, five, or six circumferentially separated portions. Although having circumferentially separated portions may be more technically complex it can provide a pipe with superior strength.

If the first circumferential portion consists of two or more circumferentially separated portions it may be preferable that they are substantially equally spaced about the outer circumference. This can provide a pipe with more uniform physical properties about its circumference.

The inner pipe of the present invention may be any suitable pipe and can be formed of any suitable material, including, but not limited to, polymeric pipes, such as HDPE and nylon pipes. The reinforcing tape of the present invention may be any suitable tape including, but not limited to, unidirectional tape. An example of a suitable tape is Celstran® CFR-TP.

The present invents on also provides a reinforced pipe consisting of an inner pipe that is wrapped in reinforcing tape, the reinforced pipe having an outer circumference consisting of a first circumferential portion and a second circumferential portion; wherein the reinforcing tape of the first circumferential portion has been heated and fused; and the reinforcing tape of the second circumferential portion is not fused.

The reinforced pipe of the present invention is advantageous in that it can be produce more cheaply and easily than reinforced pipes that are fully consolidated. In addition a reinforced pipe according to the present invention will be stronger than a pipe that is not reinforce and stronger than a pipe that is wrapped in reinforced tape that is not consolidated. In particular, as compared to a reinforced pipe that is not consolidated, the reinforcing tape of a pipe according to the present invention will provide better reinforcement and will be adhered to a pipe more effectively.

A reinforced pipe according to the present invention may comprise only a single layer of reinforcing tape. In alternative embodiments a reinforcing pipe according to the present invention may comprise two, three, four, five, six, or more layers of reinforcing tape. Having more layers of reinforcing tape can produce a stronger pipe but can make consolidation of the first circumferential portion more difficult.

If a reinforced pipe according to the present invention comprises two or more layers of reinforcing tape it may be preferable that adjacent layers of reinforcing tape are wrapped around the inner pipe in different and non-parallel directions. This is preferable as it can provide greater strength to the inner pipe, particularly over the second circumferential portion of the pipe.

The first circumferential portion of a reinforced pipe according to the present invention may be at least 10%, at least 15%, at least 20%, at least 25%, at least 35%, or at least 40% of the circumference of the pipe. The first circumferential portion of the pipe may be less than 45%, less than 40%, less than 35%, less than 30%, less than 25%, less than 20%, or less than 15% of the circumference of the pipe.

In embodiments of a reinforced pipe according to the present invention the first circumferential portion of the pipe may consist of a single circumferentially continuous portion. In alternative embodiments of a reinforced pipe according to the present invention, the first circumferential portion of the pipe may consist of two, three, four, five, six, or more circumferentially separated portions. If a first circumferential portion of a reinforced pipe according to the present invention comprises two or more circumferentially separated portions it may be preferable that said circumferentially separated portions are equally circumferentially spaced about the outer circumference of the pipe. Equally spacing said portions can help provide a more uniform strength to the reinforced pipe.

Further features and aspects of the present invention will be apparent from the preferred embodiments that are shown in the drawings and discussed below.

DRAWINGS

Figure 2:
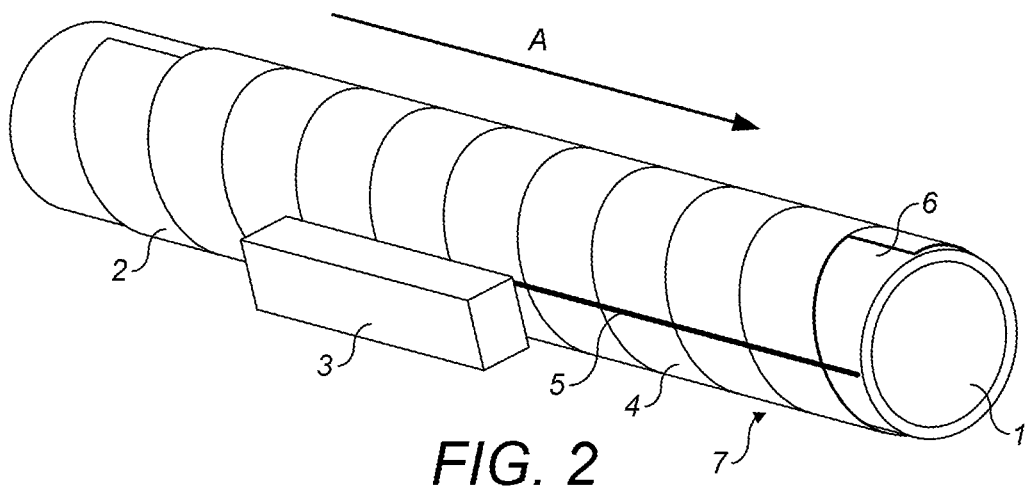
Figure 3:
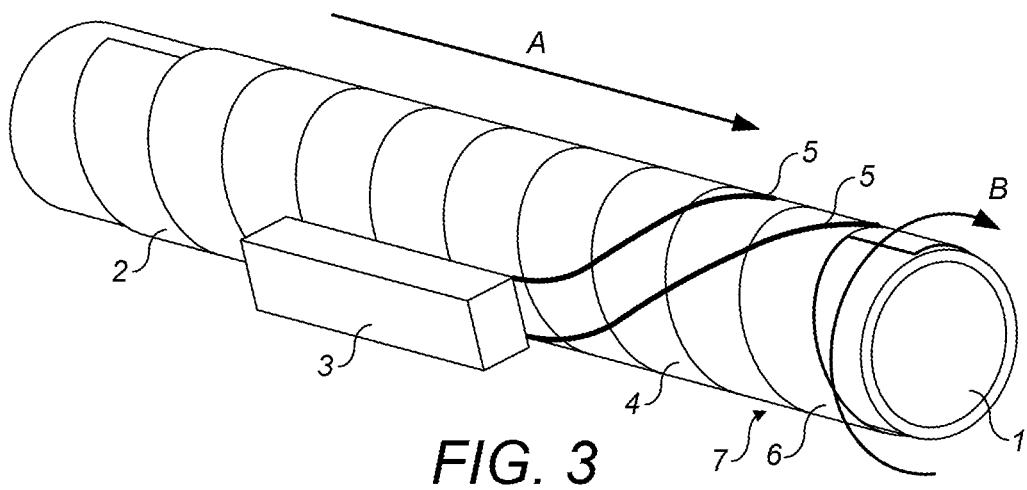

FIG. 1 shows an inner pipe wrapped with reinforcing tape prior to fusing;

FIG. 2 shows the wrapped pipe of FIG. 1 passing over a heating element to form a reinforced pipe having a first circumferential portion in accordance with a first embodiment of a method of the present invention; and FIG. 3 shows the wrapped pipe of FIG. 1 passing over a heating element to form a reinforced pipe having a first circumferential portion in accordance with a second embodiment of a method of the present invention.

FIG. 1 shows an inner pipe 1 that has been wrapped in a single layer of reinforcing tape 2, prior to undergoing any fusing, in accordance with an initial step of a method according to the present invention. The reinforcing tape 2 has been wrapped around the inner pipe 1 in a spiral such that it completely covers the inner pipe. The inner pipe 1 is formed of HDPE and the reinforcing tape 2 is Celstran® CFR-TP.

In a subsequent step of a first embodiment of a method according to the present invention the inner pipe 1 wrapped in the single layer of reinforcing tape 2 is moved past a heating element 3 in the direction A, as shown in FIG. 2. The heating element 3 acts to heat a first circumferential portion 4 of the inner pipe 1 wrapped in the single layer of reinforcing tape 2 in order to fuse the reinforcing tape 2 of said first circumferential portion 4. As the inner pipe 1 wrapped in the single layer of reinforcing tape 2 is passed over the heating element 3 the inner pipe 2 is not axially rotated relative to the heating element 3. As a result, edges 5 of the first circumferential portion 4 are substantially parallel to a longitudinal axis of the inner pipe 1. The first circumferential portion 4 extends about approximately 20% of an outer circumference of the inner pipe 1 wrapped in the reinforcing tape 2. A second circumferential portion 6 extends around the remaining approximately 80% of the outer circumference of the inner pipe 1 wrapped in the reinforcing tape 2. The reinforcing tape 2 of the second circumferential portion 6 has not passed the heating element 3, has not been significantly heated, and is not fused.

The part of the inner pipe 1 wrapped in the reinforcing tape 2 that has passed the heating element and has a first circumferential portion 4 and a second circumferential portion is a reinforced pipe 7 according to the present invention. After the whole length of the inner pipe 1 wrapped in reinforcing tape 2 has passed the heating element 4 a complete length of reinforced pipe 7 according to the present invention is formed.

FIG. 3 shows a reinforced pipe 7 being formed using a second embodiment of a method according to the present invention. The second embodiment is substantially in accordance with the first embodiment of the method of the present invention described in relation to FIG. 2 above, with the exception that the inner pipe 1 wrapped in reinforcing tape 2 is rotated in direction B as the inner pipe 1 wrapped in reinforcing tape 2 is passed past the heating element 3 in direction A. As a result of this rotation in direction B, the first circumferential portion of the reinforced pipe 7 spirals around an outer circumference of the reinforced pipe and its edges 5 are not parallel to the longitudinal axis of the inner pipe 1. Nevertheless, as for the embodiment of FIG. 2, due to the size of the heating element 3 the first circumferential portion 4 still extends about approximately 20% of an outer circumference of the reinforced pipe 7 and the second circumferential portion 6 extends around the remaining approximately 80% of the outer circumference of the reinforced pipe 7. That is, for any given circumference of the reinforced pipe 1, approximately 80% will be part of the second circumferential portion 6 and approximately 20% will be part of the first circumferential portion 4.

It is to be understood that the embodiments shown in the Figures are illustrative only and are shown to aid understanding of the invention.

The invention claimed is:

1. A method of manufacturing a reinforced pipe comprising:
    wrapping a pipe in reinforcing tape to form a wrapped pipe having an outer circumference consisting of a first circumferential portion and a second circumferential portion; and
    passing the first circumferential portion over one or more heating elements to fuse the reinforcing tape of said first circumferential portion, wherein
    the first circumferential portion is between 1% and 50% of the outer circumference,
    the second circumferential portion is not passed over a heating element and is not fused, and
    the pipe is not axially rotated relative to the one or more heating elements as the first circumferential portion is passed over said one or more heating elements.

2. The method according to claim 1, wherein the pipe is wrapped in a single layer of reinforcing tape.

3. The method according to claim 1, wherein the pipe is wrapped in two or more layers of reinforcing tape.

4. The method according to claim 3, wherein the first circumferential portion is passed over the one or more heating elements only after the pipe has been wrapped in all of the two or more layers of reinforcing tape.

5. A method of manufacturing a reinforced pipe comprising:
    wrapping a pipe in reinforcing tape to form a wrapped pipe having an outer circumference consisting of a first circumferential portion and a second circumferential portion; and
    passing the first circumferential portion over one or more heating elements to fuse the reinforcing tape of said first circumferential portion, wherein
    the first circumferential portion is between 1% and 50% of the outer circumference,
    the second circumferential portion is not passed over a heating element and is not fused, the pipe is wrapped in two or more layers of reinforcing tape, and the first circumferential portion is passed over the one or more heating elements between wrapping the pipe in successive layers of reinforcing tape.

6. The method according to claim 3, wherein adjacent layers of reinforcing tape are wrapped around the pipe in different directions.

7. The method according to claim 1, in which the first circumferential portion consists of more than 10% of the outer circumference of the wrapped pipe.

8. The method according to claim 1, wherein the first circumferential portion is passed over a single heating element.

9. The method according to claim 1, wherein the first circumferential portion is passed over two or more heating elements.

10. The method according to claim 1, wherein the one or more heating elements are rotated about the axis of the pipe.

11. The method according to claim 1, wherein the first circumferential portion is a single circumferentially continuous portion.

12. The method according to claim 1, wherein the first circumferential portion consists of two or more circumferentially separated portions and the two or more circumferentially separated portions are equally spaced about the outer circumference.

13. A reinforced pipe consisting of an inner pipe that is wrapped in reinforcing tape, the reinforced pipe having an outer circumference consisting of a first circumferential portion and a second circumferential portion; wherein the reinforcing tape of the first circumferential portion has been heated and fused, the reinforcing tape of the second circumferential portion is not fused, the first circumferential portion is between 5% and 50% of the outer circumference, the first circumferential portion consists of two or more circumferentially separated portions, and the two or more circumferentially separated portions are equally circumferentially spaced about the outer circumference of the pipe.

14. The reinforced pipe according to claim 13, wherein the inner pipe is wrapped in a single layer of reinforcing tape.

15. The reinforced pipe according to claim 13, wherein the inner pipe is wrapped in two or more layers of reinforcing tape.

16. The reinforced pipe according to claim 15, wherein adjacent layers of reinforcing tape are wrapped around the inner pipe in different and non-parallel directions.

* * * * *